Patented Feb. 7, 1939

2,146,241

UNITED STATES PATENT OFFICE 2,146,241

BREWING

Max Thomas, Stassfurt, Germany

No Drawing. Application August 11, 1936, Serial No. 95,434. In Germany September 12, 1935

5 Claims. (Cl. 99—38)

The present invention relates to a process for brewing a special beer, in particular for diabetic and corpulent subjects.

As is well known any normal finish-fermented beer still contains a certain amount of extract, which consists essentially of maltose, dextrines, albuminous bodies and mineral salts.

For example 100 gms. of a usual pale lager beer brewed from a say 12% wort contain 5.56 gms. i. e. 5.56% of actual extract.

This extract consists essentially of the following ingredients:—

|  | Per cent |
|---|---|
| Albumen | 0.45 |
| Ash | 0.19 |
| Carbohydrates | 4.83 |

The object of the present invention is to reduce the extract content of the finished beer without undesirably affecting the other essential and characteristic qualities. If there is to be no general reduction in value of the beer it is not possible to reduce the extract content of the wort as such, which would merely lead to an absolute but not a relative reduction of the extract content of the finished beer; the wort content must be maintained within the usual limits for draught, lager and export beer.

It has been found according to the invention that the unfermentable extract can be reduced to a minimum, as is necessary in beers for diabetic and corpulent subjects, without harming the other properties of the beer, as ability to froth, maintenance of froth, carbon dioxide retention, and in particular flavour, if in spite of the use of a normally saccharifying malt and a well saccharifying mashing process, mashing is effected with the addition of a diastase solution, or if diastase extract is added to a wort of normal iodine reaction or to the beer obtained therefrom, at any stage of the fermenting or maturing (lagering) processes; both measures can also be used in combination.

The use of a mainly normally saccharifying malt does not exclude the use of dark malt, colour malt and the like for producing certain types of beer according to the invention. Both light and dark beers for diabetic and corpulent subjects can therefore be made according to the new process.

The process is directed to the end that the actual extract content of the finished beer may be far lower than the normal proportion.

According to the present invention it is easily possible to get down to an actual extract content of 1% with ordinary yeast and without the aid of other fermenting organisms.

It is naturally also possible to carry out a double fermentation in manner known per se, for example first fermenting with normal yeast (Saccharomyces cerevisiæ) and then fermenting with a micro-organism which ferments dextrine to a considerable extent, such as Schizosaccharomyces pombe.

The effect of the diastase extract in the mashing of normally saccharifying malt rests on the fact that it permits the desired extensive sugar formation to be carried out in a relatively short time, with considerable exclusion of dextrine, whereby too intensive action of the proteolytic enzymes is avoided.

The effect of adding diastase extract to wort normal in iodine reaction is similar. In spite of the fact therefore that the wort has the necessary properties for a fault-free beer, it is nevertheless possible to reduce the actual extract content at the finish in the necessary manner.

It has further been found advantageous in making a special beer for diabetic and corpulent subjects, also to direct other measures in the production of the beer to the end product in view.

Advantageously a barley poor in albumen is used. In known way a well modified and low kilned pale malt is made; the latter is then treated by known processes which produce a wort poor in dextrine and albumen but rich in maltose (by the infusion process, suitably chosen mash concentration, suitable hydrogen ion concentration, and regulation of the brewing water).

In other words all known brewing steps which are designed to reduce the albumen in the wort and which affect the maltose : dextrine ratio to the advantage of the maltose can be used in making the special beer according to the invention.

The essence of the invention consists in that diastase solution is used in the present process for producing a special beer for diabetic and corpulent subjects, in cases in which it would be entirely unnecessary within the scope of the normal brewing process. In other words the use of diastase is envisaged in such cases in which hitherto the use of diastase could not be considered or thought of because from the point of view of normal brewing such an addition of diastase must be regarded as a disadvantage rather than an advantage. In spite of this it has been found possible within the scope of the present invention, even with the most extensive reduction of extract to make a beer which froths well and completely satisfies the requirements of the beer drinker.

A diastase solution will only be used in mashing of a normally saccharifying malt or with a wort normal in iodine reaction, when a special beer for diabetic or corpulent subjects is to be made.

In the production of a normal beer not designed for the present purposes, there was hitherto no call to use diastase solution in a mashing process based upon good saccharification and with the use of a normally saccharifying malt, or where a wort normal in iodine reaction is available; the idea of the invention however consists exactly in that in spite of this diastase solution is used in the production of special beers.

If diastase solution has previously been used in mashing, this was not done in the treatment of normal malt, but for example in the treatment of malt containing much steely malt, or in mashing processes which for certain reasons were not based on good saccharification.

When diastase solution was added to wort or beer, the addition was not made to wort normal in iodine reaction or to satisfactory beer, but was used for example to correct wort not normal in iodine reaction or to correct pasty turbid beer.

*Example I*

Barley low in albumen is cold floored and kilned under normal conditions. The husked malt is moistened at 63° C. and mashed for an hour with the addition of diastase solution, the temperature being gradually raised to 65° C. The mash (or parts of the mash) is now boiled, cooled to 65° C., a diastase extract added and final sugaring effected. Returning of the final boiled part of the wort from the copper to the mash tun, drawing off and boiling of the wort are effected in the usual manner. The wort so prepared is after cooling fermented with *Saccharomyces cerevisiœ* and further dealt with as usual. By way of example 2 litres of diastase extract obtained by extraction of 1 kg. of bruised green malt with 2 litres of water, are added to each 50 kg. of grain.

*Example II*

Barley low in albumen is cold floored and kilned under normal conditions. Mashing is then effected e. g. by the three mash decoction process and a normal wort prepared in the usual manner. The wort so obtained is after cooling fermented and matured (lagered) in the usual manner; for example at the end of lagering 1 litre of diastase extract is added per hektolitre of unfiltered beer, with which the beer, for example at about 15° C. is allowed to go on fermenting for 1-3 days. The beer so obtained is further dealt with as usual.

The diastase extract used is obtained for instance by grinding green malt, extracting it with a dilute aqueous alcoholic solution and then filtering; the diastase-green malt extract can be degerminated for example by the aid of a degerminating filter.

What I claim is:—

1. The method of preparing a low-extract beer suitable for consumption by diabetics which comprises preparing a wort of normal iodine reaction which without further treatment might be fermented by normal fermentation procedure to produce a wholly satisfactory beer, and fermenting said wort with *Saccharomyces cerevisiœ* in the presence of a vegetable diastase solution to produce a finished beer having an extract content materially below that of a normally brewed beer from the same wort, but possessing the essential and characteristic qualities of such a normally brewed beer.

2. The method of preparing a low-extract beer suitable for consumption by diabetics which comprises preparing a wort of normal iodine reaction which without further treatment might be fermented by normal fermentation procedure to produce a wholly satisfactory beer, fermenting said wort with *Saccharomyces cerevisiœ*, and adding to the fermenting wort or beer prior to completion of the fermentation a vegetable diastase solution, so that a finished beer is produced having an extract content materially below that of a normally brewed beer from the same wort, but possessing the essential and characteristic qualities of such a normally brewed beer.

3. The method of preparing a low-extract beer suitable for consumption by diabetics which comprises preparing a wort of normal iodine reaction which without further treatment might be fermented by normal fermentation procedure to produce a wholly satisfactory beer, fermenting said wort with *Saccharomyces cerevisiœ*, and completing the fermentation in the presence of a vegetable diastase solution to produce a finished beer having an extract content materially below that of a normally brewed beer from the same wort, but possessing the essential and characteristic qualities of such a normally brewed beer.

4. The method of preparing a low extract beer suitable for consumption by diabetics which comprises preparing a wort of normal iodine reaction and having as high a maltose:dextrin ratio as can be obtained by conventional malting and mashing procedure, which wort without further treatment might be fermented by normal fermentation procedure to produce a wholly satisfactory beer, and fermenting said wort with *Saccharomyces cerevisiœ* in the presence of a vegetable diastase solution to produce a finished beer having an extract content materially below that of a normally brewed beer from the same wort, but possessing the essential and characteristic qualities of such a normally brewed beer.

5. The method of preparing a low extract beer suitable for consumption by diabetics which comprises preparing a wort of normal iodine reaction which without further treatment might be fermented by normal fermentation procedure to produce a wholly satisfactory beer, and fermenting said wort with *Saccharomyces cerevisiœ* in the presence of a vegetable diastase solution to produce a finished beer having an extract content materially below that of a normally brewed beer from the same wort and of the order of 1%, but possessing the essential and characteristic qualities of such a normally brewed beer.

MAX THOMAS.